United States Patent
Pflügler et al.

(10) Patent No.: US 8,043,591 B2
(45) Date of Patent: Oct. 25, 2011

(54) PROCESS FOR PREPARING TRICHLOROMONOSILANE

(75) Inventors: Bernhard Pflügler, Burghausen (DE); Gerhard Traunspurger, Burghausen (DE); Walter Grünleitner, Haiming (DE)

(73) Assignee: Wacker Chemie AG, Munich (DE)

( * ) Notice: Subject to any disclaimer, the term of this patent is extended or adjusted under 35 U.S.C. 154(b) by 655 days.

(21) Appl. No.: 11/096,605

(22) Filed: Apr. 1, 2005

(65) Prior Publication Data

US 2005/0226803 A1  Oct. 13, 2005

(30) Foreign Application Priority Data

Apr. 8, 2004 (DE) .................. 10 2004 017 453

(51) Int. Cl.
  *C01B 33/107* (2006.01)
(52) U.S. Cl. ........................ 423/342; 423/341
(58) Field of Classification Search .................. 423/341, 423/342
  See application file for complete search history.

(56) References Cited

U.S. PATENT DOCUMENTS

| | | | |
|---|---|---|---|
| 2,466,412 A | 4/1949 | Gilliam et al. | |
| 4,092,446 A | 5/1978 | Padovani et al. | |
| 4,224,297 A * | 9/1980 | Straussberger et al. | 423/348 |
| 4,526,769 A * | 7/1985 | Ingle et al. | 423/342 |
| 4,986,971 A * | 1/1991 | Forwald et al. | 423/342 |
| 5,063,040 A | 11/1991 | Ruff et al. | |
| 5,164,138 A | 11/1992 | Dietl et al. | |
| 5,871,705 A * | 2/1999 | Sakata et al. | 423/342 |
| 2002/0151737 A1 | 10/2002 | Kalchauer et al. | |
| 2004/0101463 A1* | 5/2004 | Bulan et al. | 423/342 |

FOREIGN PATENT DOCUMENTS

| | | |
|---|---|---|
| DE | 3 230 590 | 3/1983 |
| DE | 3 938 897 | 6/1990 |
| EP | 1249453 | 10/2002 |
| GB | 945618 | 1/1964 |
| JP | 63-170210 | 7/1988 |

OTHER PUBLICATIONS

Derwent Abstract corresponding to EP 1 249 453 A1.
Derwent Abstract corresponding to DE 39 38 897 A1.
Derwent Abstract corresponding to DE 3 230 590 C2.
Patent Abstract corresponding to JP 63-170210.
Ullmann'S Encyclopedia of Industrial Chemistry, 2002, vol. A23, pp. 724-726.

* cited by examiner

*Primary Examiner* — Ngoc-Yen Nguyen
(74) *Attorney, Agent, or Firm* — Brooks Kushman P.C.

(57) ABSTRACT

A process for preparing trichloromonosilane, in which silicon particles are reacted with hydrogen chloride in a fluidized bed reactor, wherein the silicon particles used are a silicon dust which is obtained as a waste product in the preparation of defined silicon particle size fractions from lump-form silicon and the silicon dust is introduced directly into the reactor.

15 Claims, 1 Drawing Sheet

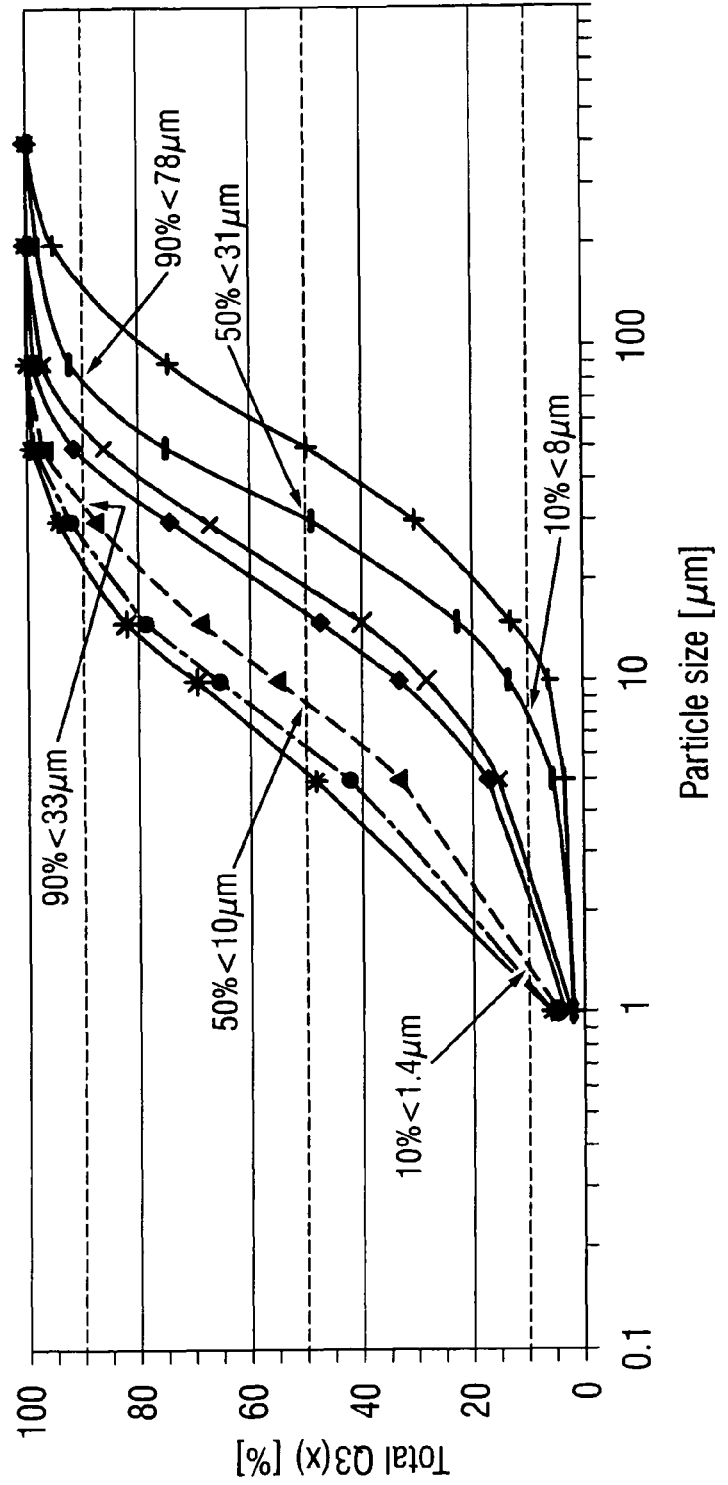

PROCESS FOR PREPARING TRICHLOROMONOSILANE

BACKGROUND OF THE INVENTION

1. Field of the Invention

The invention relates to a process for preparing trichloromonosilane from particulate silicon and gaseous hydrogen chloride.

2. Background Art

The demand for ultrapure silicon for the semiconductor industry and the photovoltaic industry has risen sharply in the last few years. From the various production routes, deposition from trichlorosilane with hydrogen has been found to be a commercially attractive variant. Thus, 90% of the silicon used in the semiconductor field is prepared with the aid of purified trichlorosilane. The preparation of trichlorosilane from metallurgical silicon is carried out in fluidized bed reactors. This is described, for example, in U.S. Pat. No. 4,092,446, in which hydrogen chloride flows through a silicon bed consisting of silicon particles. The hydrogen chloride reacts with the silicon particles to give tetrachlorosilane and trichloromonosilane and hydrogen. However, the patent is silent with respect to either the particle size distribution needed in the reactor or the optimal particle size distribution necessary to achieve a very high trichloromonosilane content in the product gas. Both unconverted hydrogen chloride and high by-production of tetrachlorosilane increase the process costs considerably.

ULLMANNS ENCYKLOPÄDIE DER TECHNISCHEN CHEMIE [ULLMANN'S ENCYCLOPEDIA OF TECHNICAL CHEMISTRY], published in 2002, describes the preparation process in such fluidized bed reactors at a reactor temperature of 650° C. Hydrogen chloride reacts with the silicon particles at this temperature preferentially to give trichloromonosilane and hydrogen.

DE A1 3938897 shows that the tetrachlorosilane:trichloromonosilane ratio is dependent upon the temperature maintained in the reactor. It is also demonstrates that, with an increase in the homogeneity of the silicon particles used, the proportion of hydrogen chloride gas in the product gas is only 3% and a product lower in $SiCl_4$ is obtained. According to DE A1 3938897, it is advantageous to use a silicon powder which has been obtained by gas atomization of molten Si and has a particle size distribution between 1 and 1000 μm, or preferably between 50 and 800 μm, to prepare trichloromonosilane in a fluidized bed reactor.

In contrast to a fluidized bed process, DE C2 3239590 describes a moving bed process for preparing trichlorosilane and tetrachlorosilane. In this case, the silicon is present in lump form.

UK patent 945,618 discloses the use of silicon particle size fractions of from 30 to 500 μm, preferably from 50 to 200 μm, for preparing trichloromonosilane in a fluidized bed reactor. This commercially available material may be purified further before use.

US 2002/0151737 A1, corresponding to EP A1 1 249 453 discloses the initial introduction of Si dust into a liquid and only then into a reactor (Muiller-Rochow or trichloromonosilane synthesis). This process is costly and inconvenient, and the silicon powder to be used is brought to the necessary fineness by a grinding step.

SUMMARY OF THE INVENTION

It is an object of the present invention to provide an inexpensive process for preparing trichloromonosilane. This and other objects are achieved by a process in which silicon particles are reacted with hydrogen chloride in a fluidized bed reactor, wherein the silicon particles used are a silicon dust which is obtained as a waste product in the preparation of defined silicon particle size fractions from lump-form silicon and the silicon dust is introduced directly into the reactor. Silicon dusts are obtained in the preparation of defined silicon particle sizes, for example for use in methylchlorosilane synthesis and trichlorosilane synthesis. Lump-form silicon having an edge length of up to 0.5 m is initially crushed. After the crushing, the silicon is ground and subsequently sieved or classified. Thus, ground silicon having a defined particle size distribution is prepared. In all process steps (crushing, grinding, sieving and classifying), Si dust which forms is extracted. This dust is used in accordance with the invention for preparing trichloromonosilane but has hitherto either been discarded, or melted and ground again in an energy-intensive manner, both associated with costs which can be saved by the process of the invention. By virtue of the utilization of the waste silicon dusts, which are obtained annually in large amounts worldwide, the inventive process offers a great economic advantage. Reprocessing costs or disposal costs of the dusts also no longer occur. The invention also relates to the use of a silicon dust which is obtained as a waste product in the comminution of lump-form silicon, for preparing trichloromonosilane in a fluidized bed reactor.

BRIEF DESCRIPTION OF THE DRAWINGS

FIG. 1 shows the total particle size distributions of silicon particles of the examples and comparative examples.

DETAILED DESCRIPTION OF THE PREFERRED EMBODIMENT(S)

Preference is given to using a silicon dust which has a maximum particle size of 80 μm. The silicon dust more preferably has such a total particle size distribution that 10% of the silicon particles based on the total number of all silicon particles are at least 1.3 μm and at most 8 μm in size, and 50% of the silicon particles based on the total number of all silicon particles are at least 9 μm and at most 31 μm in size, and 90% of the silicon particles based on the total number of all silicon particles are at least 32 μm and at most 78 μm in size. The particle size distribution is preferably measured by means of laser scattered-light measurement. It is possible to use laser diffraction spectrometers, for example the "HELOS" model from Sympatec. The measurement method is according to ISO 13320. The samples are dispersed in dry form with compressed air and fed to the measurement cell in the airstream. For sample pretreatment, the samples are baked out at 105° C. over a period of 3 hours.

As is well known, the reaction of metallic silicon with hydrogen chloride proceeds very rapidly. A crucial factor for this reaction is the surface area of the silicon particles used. When a finer particle size fraction is used, the solid present per unit volume has a correspondingly larger surface area. It is therefore to be expected that the use of dusts should lead to higher exothermicity in the fluidized bed and thus to a lowering in the trichloromonosilane selectivity. However, in the present invention, this effect is surprisingly not observed. Instead, completely unexpected opposite effects are observed, which leads to an increase in the trichloromonosilane selectivity. In fact, it has been found that the use of the very fine Si particles mentioned, obtained in considerable amounts when lump-form silicon is comminuted, in a trichloromonosilane reactor for the preparation of trichloromonosilane by reaction of silicon particles with hydrogen chloride gas, results in a product gas which is richer in trichloromonosilane and simultaneously low in hydrogen chloride. As a result of this, the process costs for the preparation of trichloromonosilane are lowered markedly.

The silicon dust used with preference in the process according to the invention is therefore preferably a waste dust as is obtained in the preparation of defined silicon particle size fractions. However, owing to the process advantages to be achieved with this particle size fraction, it is equally possible to deliberately prepare the silicon particle size fractions mentioned.

The invention thus also relates to a silicon dust consisting of a mixture of silicon particles, wherein the silicon particles have a maximum particle size of 80 µm, the silicon dust having such a total particle size distribution that 10% of the silicon particles based on the total number of all silicon particles are at least 1.3 µm and at most 8 µm in size, and 50% of the silicon particles based on the total number of all silicon particles are at least 9 µm and at most 31 µm in size, and 90% of the silicon particles based on the total number of all silicon particles are at least 32 µm and at most 78 µm in size.

The use of this fine-particle silicon dust lowers the process costs in the preparation of trichloromonosilane by reaction of silicon particles with hydrogen chloride gas without a catalyst such as copper, since a product gas which is richer in trichloromonosilane and lower in hydrogen chloride is obtained. The trichloromonosilane/tetrachlorosilane selectivity is greatly temperature-dependent. Therefore, the heat control by means of cooling is a particular challenge in the process according to the invention. Preference is given to carrying out the process at a temperature of from 250 to 600° C., more preferably at a temperature of from 280 to 400° C.

Preference is given to adding hydrogen chloride and silicon powder to the process in a molar ratio of from 4:1 to 3:1, more preferably nearly stoichiometrically, in a molar hydrogen chloride: silicon powder ratio of 3.1:1. The pressure in the reactor during the process according to the invention is preferably from 0 to 5 bar gauge, preferably 1 bar gauge. The fluidized bed height:reactor diameter ratio is preferably between 10:1 and 1:1, more preferably from 8:1 to 2:1, and most preferably approximately 4:1. The condensable fractions are removed from the resulting product gas by a low-temperature condensation at −40° C.

The examples which follow serve to further illustrate the invention.

Example 1

Preparation of Si Particle Size Fractions

Commercial silicon (iron content 1.4% by weight, aluminum 0.2% by weight, calcium 0.015% by weight) was processed with conventional processes, by comminution, grinding and sieving of block-cast silicon, into groups having different silicon particle size distributions. The composition of the particle size fractions is specified in Table 1 (PSF 1-3). The different silicon particle size distributions were used as comparative examples. The examples were carried out in a fluidized bed reactor, as illustrated in U.S. Pat. No. 4,092,446, FIG. 12.

Example 2

Definition of a Baseline (Comparative Example)

The reactor was charged with silicon of a standard particle size distribution. The particle size distribution was as follows: 10% of the particles <100 µm, 50% of the particles <300 µm and 90% of the particles <500 µm (standard).

Initially, the silicon bed was flushed with $N_2$ until the silicon fluidized bed had formed. As this was done, it was ensured that the fluidized bed height:reactor diameter ratio was approximately 4. The fluidized bed was then brought to a temperature of 300° C. with an external heater. This temperature was maintained over the entire experimental period with the aid of a cooler. Subsequently, hydrogen chloride and a silicon powder having the abovementioned particle size distribution were added in a stoichiometry of 3:1. The height of the fluidized bed remained constant over the entire experimental period. The pressure in the reactor over the experimental period was 1 bar gauge. After 48 h of reactor running time, a liquid sample and simultaneously a gas sample were each taken. The condensable fractions of the product gas were condensed using a cold trap at −40° C. and the liquid obtained was analyzed by gas chromatography (GC). Detection was effected using a thermal conductivity detector. The uncondensable fraction of the product gas was analyzed with an infrared spectrometer (IR) for unconverted hydrogen chloride [% by vol.]. In each case, two measurements were made at a one-hour interval (after 48 and 49 h), and the average reported. The hydrogen chloride content in the residual gas (product gas without the condensable fractions) was determined at 13.3% by volume; the trichloromonosilane content in the condensate was measured at 71%.

Example 3

The procedure described in Example 2 was now carried out with different silicon powders. The type 1 to 4 powders are waste powders and in accordance with the present invention. The particle size fractions PSF 1-3 are particle fractions which have been prepared for comparative purposes. The largest particles of these silicon powders had a maximum particle size of <500 µm.

After each experimental run, the reactor was emptied completely, refilled with silicon and the samples were again taken 48 h after the start of the reaction.

Table 1 specifies the particle size distributions of the silicon dusts (I: inventive example, C: comparative example) and the results achieved.

TABLE 1

| Powder | Particle Size Distribution | | | HCl Content of Residual Gas (% by vol.) | Trichloromonosilane Selectivity |
|---|---|---|---|---|---|
| Standard | 10% < 100 µm | 50% < 300 µm | 90% < 500 µm | HCl: 13.3% | 71% |
| I: TYPE 1 | 10% < 1.4 µm | 50% < 10 µm | 90% < 33 µm | HCl: 0.8% | 87% |
| I: TYPE 2 | 10% < 2.2 µm | 50% < 16 µm | 90% < 49 µm | HCl: 0.7% | 88.5% |
| I: TYPE 3 | 10% < 2.8 µm | 50% < 20 µm | 90% < 60 µm | HCl: 1.1% | 85.4% |
| I: TYPE 4 | 10% < 8 µm | 50% < 31 µm | 90% < 78 µm | HCl: 0.8% | 87% |
| C: PSF 1 | 10% < 1.1 µm | 50% < 7 µm | 90% < 28 µm | HCl: 9.2% | 78.2% |

TABLE 1-continued

| Powder | Particle Size Distribution | | | HCl Content of Residual Gas (% by vol.) | Trichloromonosilane Selectivity |
|---|---|---|---|---|---|
| C: PSF 2 | 10% < 1.1 μm | 50% < 5 μm | 90% < 22 μm | HCl: 8.3% | 77.2% |
| C: PSF 3 | 10% < 14 μm | 50% < 50 μm | 90% < 180 μm | HCl: 7.5% | 78.2% |

The results demonstrate that the use of an Si powder having the inventive particle size distribution achieves a distinct improvement in the preparation process of trichloromonosilane from silicon and hydrogen chloride. The process yield, i.e. the hydrogen chloride conversion and trichloromonosilane yield reported in Table 1 rises unexpectedly.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the commercial preparation of trichlorosilane comprising reacting silicon dust particles with hydrogen chloride in a fluidized bed reactor, the silicon dust consisting essentially of metallurgical grade silicon dust, said silicone dust directly obtained as a waste product in the preparation of defined silicon particle size fractions from metallurgical grade lump-form silicon, the silicon dust having a silicon dust particle size distribution within the bounds of Type 1 and Type 4 silicon dusts of FIG. 1, and separating trichloromonosilane from a product gas stream, wherein the trichlorosilane is suitable for the preparation of ultrapure silicon in the semiconductor and photovoltaic industries.

2. The process of claim 1, wherein the silicon dust is a waste dust which is obtained in the preparation of specific silicon particle sizes for use in methylchlorosilane synthesis and trichlorosilane synthesis.

3. The process of claim 1, wherein the silicon dust has a particle distribution such that the particle size corresponding to 10% of particles on a particle size distribution curve is in the range of 1.3 μm to 8 μm.

4. The process of claim 2, wherein the silicon dust has a particle distribution such that the particle size corresponding to 10% of particles on a particle size distribution curve is in the range of 1.3 μm to 8 μm.

5. The process of claim 1, wherein no catalyst is present.

6. The process of claim 1, wherein the metallurgical grade silicon consists essentially of silicon.

7. The process of claim 1, wherein the silicon dust particles consist of metallurgical grade silicon.

8. The process of claim 1, wherein no copper catalyst is present.

9. The process of claim 1, wherein the silicon dust is reacted with HCl in a mol ratio of silicon to HCl of from 1:3 to 1:4.

10. The process of claim 1, wherein the silicon dust is reacted with HCl in a mol ratio of silicon to HCl of from 1:3.1.

11. A process for preparing trichloromonosilane, comprising:
    a) crushing lump metallurgical silicon and isolating a silicon dust having a particle size distribution within the confines of Type 1 and Type 4 silicon dusts of FIG. 1;
    b) introducing a silicon dust consisting essentially of the silicon dust of step a) directly into a fluidized bed reactor; and
    c) reacting the silicon dust with hydrogen chloride to form trichloromonosilane at a temperature in the range of 280° C. to 400° C.

12. The process of claim 11, wherein no catalyst is present.

13. The process of claim 11, wherein no copper catalyst is present.

14. The process of claim 11, wherein the mole ratio of silicon to HCl is about 1:3.

15. The process of claim 11, wherein the trichloromonosilane product is suitable for preparation of ultrapure silicon for use in manufacturing photovoltaic cells.

* * * * *